(12) United States Patent
Suzuki

(10) Patent No.: US 8,152,219 B2
(45) Date of Patent: Apr. 10, 2012

(54) VEHICLE DOOR STRUCTURE

(75) Inventor: Hiroto Suzuki, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 35 days.

(21) Appl. No.: 12/578,014

(22) Filed: Oct. 13, 2009

(65) Prior Publication Data

US 2010/0090495 A1     Apr. 15, 2010

(30) Foreign Application Priority Data

Oct. 14, 2008 (JP) ................................. 2008-265706

(51) Int. Cl.
*B60J 5/00* (2006.01)

(52) U.S. Cl. ................ 296/146.6; 296/146.5; 296/146.7

(58) Field of Classification Search ............... 296/146.7, 296/146.6, 146.5, 202, 193.05; 49/502; 180/271, 180/274; 280/735
See application file for complete search history.

(56) References Cited

U.S. PATENT DOCUMENTS

| | | | | |
|---|---|---|---|---|
| 5,281,780 A | * | 1/1994 | Haland | .................... 200/52 R |
| 5,793,005 A | * | 8/1998 | Kato | ..................... 200/61.45 R |
| 7,093,886 B2 | * | 8/2006 | Blust et al. | .................. 296/146.6 |
| 7,097,201 B2 | * | 8/2006 | Breed et al. | ................. 280/730.2 |
| 7,118,126 B2 | * | 10/2006 | Wehner et al. | ................. 280/735 |
| 7,614,685 B2 | * | 11/2009 | Oka | ......................... 296/187.12 |

FOREIGN PATENT DOCUMENTS

JP         7-2049         1/1995

* cited by examiner

*Primary Examiner* — Glenn Dayoan
*Assistant Examiner* — Sunsurraye Westbrook
(74) *Attorney, Agent, or Firm* — Finnegan, Henderson, Farabow, Garrett & Dunner, LLP

(57) ABSTRACT

A vehicle door structure includes: a door body that includes an inner panel and an outer panel and that has a space between the inner panel and the outer panel; an acceleration detector that is arranged in the space; a support portion that supports the acceleration detector on the door body so that a direction of sensitivity of the acceleration detector differs from a direction in which the door body is closed; and a sensitivity direction changing portion that changes a position in which the acceleration detector is supported by the support portion so that the direction of sensitivity of the acceleration detector approaches a direction in which the inner panel faces the outer panel as the outer panel is relatively displaced toward the inner panel.

11 Claims, 7 Drawing Sheets

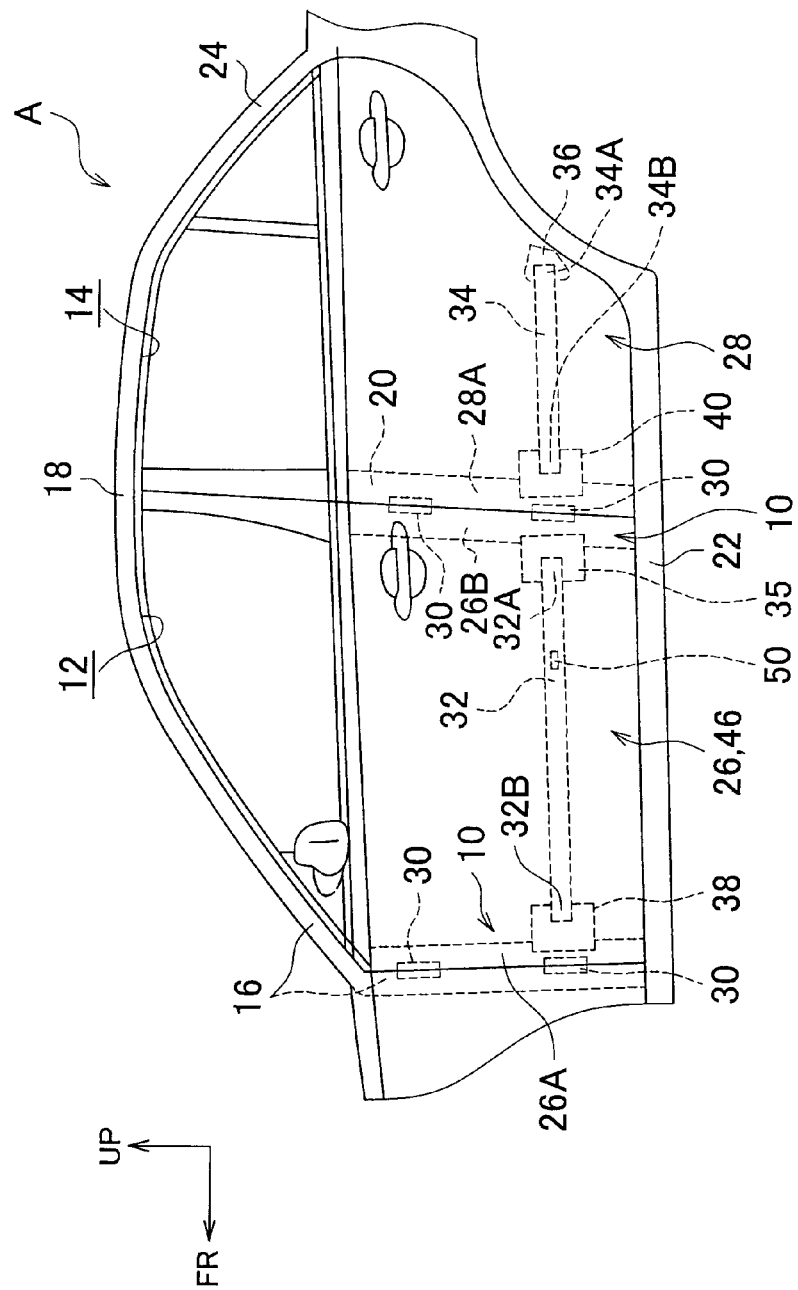

VEHICLE DOOR STRUCTURE

INCORPORATION BY REFERENCE

The disclosure of Japanese Patent Application No. 2008-265706 filed on Oct. 14, 2008 including the specification, drawings and abstract is incorporated herein by reference in its entirety.

BACKGROUND OF THE INVENTION

1. Field of the Invention

The invention relates to a vehicle door structure applied to a vehicle, such as an automobile.

2. Description of the Related Art

For example, Japanese Patent Application Publication No. 7-2049 (JP-A-7-2049) describes a known technique for attaching an accelerometer to an inner panel in a space between the inner panel and an outer panel that constitute a side door.

However, in the technique described in JP-A-7-2049, it is feared that the accelerometer might detect an acceleration when the side door is slammed.

SUMMARY OF THE INVENTION

The invention provides a vehicle door structure that is able to detect an acceleration at the time when an outer panel is displaced toward an inner panel as distinguished from an acceleration at the time when a door body is closed to shut a vehicle body opening.

A first aspect of the invention provides a vehicle door structure. The vehicle door structure includes: a door body that includes an inner panel and an outer panel and that has a space between the inner panel and the outer panel; an acceleration detector that is arranged in the space; a support portion that supports the acceleration detector on the door body so that a direction of sensitivity of the acceleration detector differs from a direction in which the door body is closed; and a sensitivity direction changing portion that changes a position in which the acceleration detector is supported by the support portion so that the direction of sensitivity of the acceleration detector approaches a direction in which the inner panel faces the outer panel as the outer panel is relatively displaced toward the inner panel.

With the vehicle door structure according to the first aspect, the acceleration detector is normally supported by the support portion so that the direction of sensitivity differs from a direction in which a vehicle body opening is opened or closed. This prevents the acceleration detector from outputting a signal corresponding to an input of a large acceleration as the vehicle body opening is opened or closed by the door body (the door body is displaced as a whole). On the other hand, when (part of or the entire) outer panel is relatively displaced toward the inner panel, the position of the support portion is changed by the sensitivity direction changing portion.

As the position of the support portion changes, the direction of sensitivity of the acceleration detector approaches the direction in which the inner panel faces the outer panel (door thickness direction). That is, the detectivity of acceleration in the direction in which the inner panel faces the outer panel increases. Thus, in the vehicle door structure, the acceleration detector has a low sensitivity to door closing action, whereas the acceleration detector has a high sensitivity to a displacement of the outer panel toward the inner panel.

In this way, with the vehicle door structure according to the first aspect, it is possible to detect an acceleration at the time when the outer panel is displaced toward the inner panel as distinguished from an acceleration at the time when the door body is closed to shut the vehicle body opening.

A second aspect of the invention provides a vehicle door structure. The vehicle door structure includes: a door body that includes an inner panel and an outer panel and that has a space between the inner panel and the outer panel; an acceleration detector that is arranged in the space; a bracket that has a cantilever structure in which one end of the bracket is a supported portion supported by the door body and the other end of the bracket is a free end, wherein the bracket holds the acceleration detector at a location that is distanced from the supported portion toward the free end; and a pressing member that presses a location of the bracket, distanced from the supported portion toward the free end, as the outer panel is relatively displaced toward the inner panel to deform the bracket to thereby change a position in which the acceleration detector is supported so that a direction of sensitivity of the acceleration detector approaches a direction in which the inner panel faces the outer panel.

In addition, in the vehicle door structure according to the second aspect, the supported portion of the bracket may be supported so that the direction of sensitivity of the acceleration detector held by the bracket differs from a direction in which the door body is closed.

In the vehicle door structure according to the second aspect, the acceleration detector is normally supported by the cantilever bracket so that the direction of sensitivity differs from a direction in which a vehicle body opening is opened or closed. This prevents the acceleration detector from outputting a signal corresponding to an input of a large acceleration as the vehicle body opening is opened or closed by the door body (the door body is displaced as a whole). On the other hand, when (part of or the entire) outer panel is relatively displaced toward the inner panel, the pressing member presses the bracket to deform.

As the bracket deforms, the direction of sensitivity of the acceleration detector approaches the direction in which the inner panel faces the outer panel (door thickness direction). That is, the detectivity of acceleration in the direction in which the inner panel faces the outer panel increases. Thus, in the vehicle door structure according to the second aspect, the acceleration detector has a low sensitivity to door closing action, whereas the acceleration detector has a high sensitivity to a displacement of the outer panel toward the inner panel.

In this way, with the vehicle door structure according to the second aspect, it is possible to detect an acceleration at the time when the outer panel is displaced toward the inner panel as distinguished from an acceleration at the time when the door body is closed to shut the vehicle body opening.

A third aspect of the invention provides a vehicle door structure. The vehicle door structure includes: a door body that includes an inner panel and an outer panel and that has a space between the inner panel and the outer panel; an acceleration detector that is arranged in the space; a movable arm that includes a proximal portion that is rotatably supported by the door body, a sensor holding arm that is extended from the proximal portion and that holds the acceleration detector, and a load receiving arm that is extended from the proximal portion in a direction different from a direction in which the sensor holding arm is extended; and a pressing member that presses the load receiving arm of the movable arm as the outer panel is relatively displaced toward the inner panel to rotate the movable arm to thereby change a position in which the acceleration detector is supported so that a direction of sensitivity of the acceleration detector approaches a direction in which the inner panel faces the outer panel.

As described above, the vehicle door structure according to the above aspects of the invention is able to detect an acceleration at the time when an outer panel is displaced toward an inner panel as distinguished from an acceleration at the time when a door body is closed to shut a vehicle body opening.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 3 is a side view that shows an automobile to which the vehicle door structure according to the first embodiment of the invention is applied;

DETAILED DESCRIPTION OF EMBODIMENTS

Figure 1:
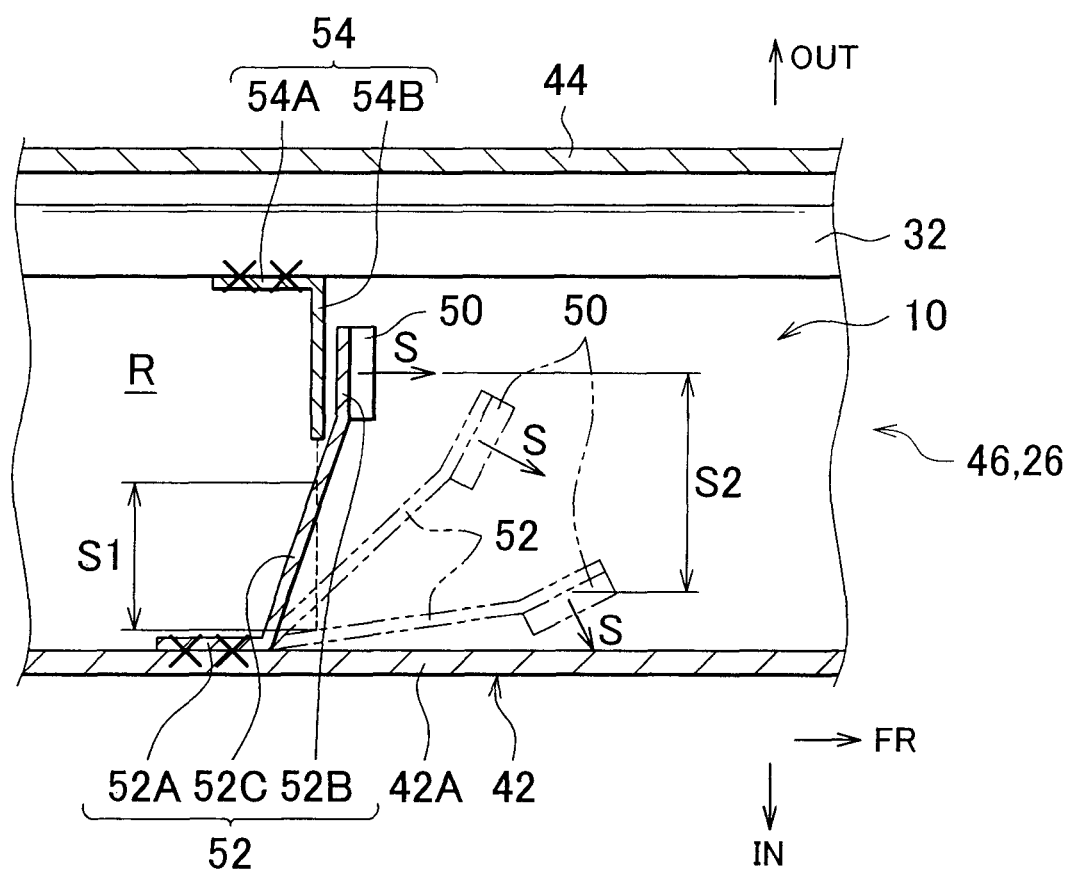
FIG. 1 is an enlarged schematic horizontal cross-sectional view that shows a relevant portion of a vehicle door structure according to a first embodiment of the invention.

A vehicle side door structure 10, which serves as a vehicle door structure according to a first embodiment of the invention, will be described with reference to FIG. 1 to FIG. 3. Note that the arrow FR, the arrow UP, the arrow IN and the arrow OUT in the drawings respectively indicate the forward direction (traveling direction), upward direction, inner side in the vehicle width direction and outer side in the vehicle width direction of an automobile to which the vehicle side door structure 10 is applied.

FIG. 3 shows a side view of an automobile A to which the vehicle side door structure 10 is applied. As shown in the drawing, the automobile A has vehicle body openings 12 and 14 at the vehicle body side to allow occupants to get on or off. More specifically, the front vehicle body opening 12 is surrounded and defined by a front pillar 16, a roof side rail 18, a center pillar 20 and a rocker 22, each of which constitutes a vehicle body frame. The rear vehicle body opening 14 is surrounded and defined by the center pillar 20, the roof side rail 18, a rear pillar 24 and the rocker 22, each of which constitutes the vehicle body frame.

Then, the vehicle body opening 12 is opened or closed by a front side door 26. The vehicle body opening 14 is opened or closed by a rear side door 28. Thus, the width direction (door width direction) of each of the front side door 26 and the rear side door 28 according to the present embodiment coincides with a vehicle longitudinal direction, and the thickness direction (door thickness direction) of each of the front side door 26 and the rear side door 28 coincides with a vehicle width direction. In the present embodiment, the front side door 26 and the rear side door 28 are respectively supported at front end portions 26A and 28A pivotably about axes in the vehicle vertical direction via pairs of upper and lower door hinges 30, and are pivoted to open or close the vehicle body openings 12 and 14, respectively.

These front side door 26 and rear side door 28 respectively include impact beams 32 and 34 as reinforcement members. The longitudinal direction of each of the impact beams 32 and 34 coincides with the vehicle longitudinal direction. Respective rear end portions 32A and 34A of the impact beams 32 and 34 are connected to a door body 46 (which will be described later) via extensions 35 and 36. In addition, respective front end portions 32B and 34B of the impact beams 32 and 34 are connected to the door body via extensions 38 and 40.

The vehicle side door structure 10 according to the present embodiment includes an attachment structure, in which an acceleration sensor 50 (which will be described later) is attached to a side door, as a major portion. The vehicle side door structure 10 may be applied to any of the front side door 26 and the rear side door 28. The structure of the vehicle side door structure 10 is basically common to the front side door 26 and the rear side door 28, so the vehicle side door structure 10 applied to front side door 26 will be mainly described below.

Figure 2:
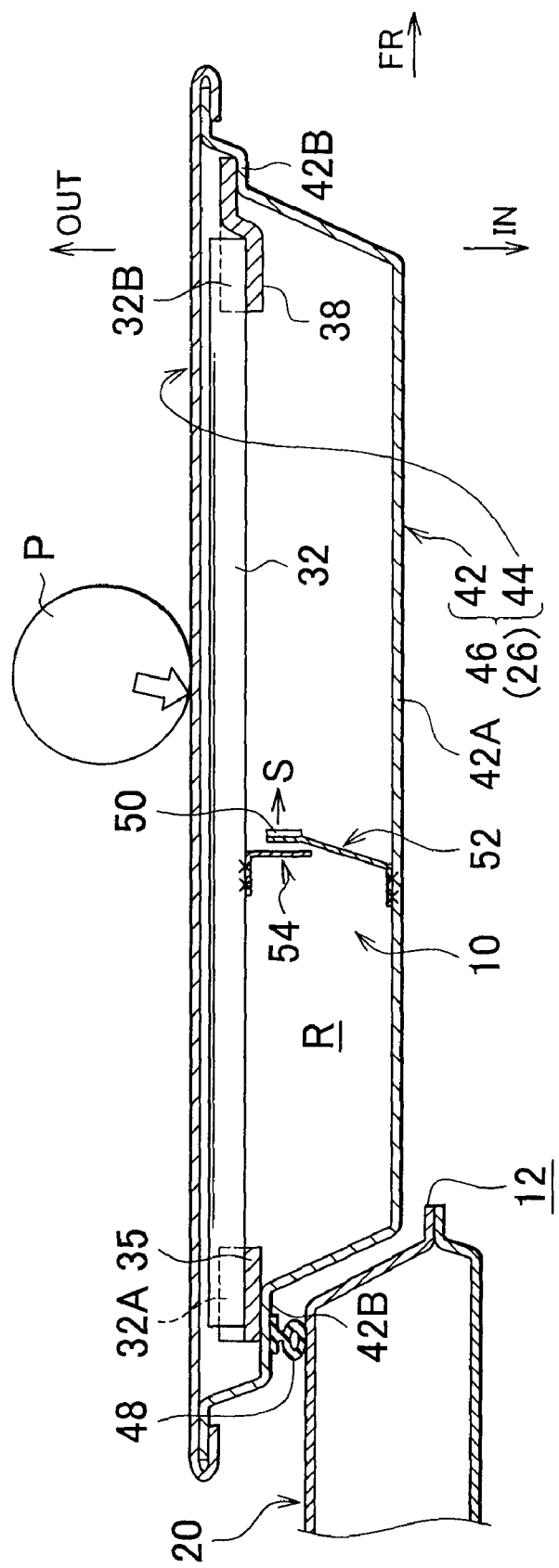
FIG. 2 is a schematic horizontal cross-sectional view that shows a front side door to which the vehicle door structure according to the first embodiment of the invention is applied.

As is schematically shown in FIG. 2, the front side door 26 includes the door body 46. The door body 46 is formed as a hollow structure such that a peripheral portion of an outer panel 44 is connected to a peripheral portion of an inner panel 42 by hemming. The inner panel 42 has a recess that is open outward in the vehicle width direction. The above described impact beam 32 is arranged inside the door body 46.

More specifically, the front end portion 26A and rear end portion 26B of the front side door 26 are formed as shallow drawn portions 42B of which the draw depth is shallower than that of a flat portion 42A that forms the bottom of a deep drawn portion of the inner panel 42. Thus, the front end portion 26A and rear end portion 26B of the front side door 26 are thin in the vehicle width direction. The impact beam 32 is connected to the front and rear shallow drawn portions 42B via the extensions 35 and 38. Thus, the impact beam 32 is fixed to the door body 46 in a state where the impact beam 32 is located adjacent to the outer panel 44.

In addition, as shown in FIG. 2, when the front side door 26 is in a position to close the vehicle body opening 12, the rear end portion 26B overlaps with the center pillar 20 in side view (from the outer side in the vehicle width direction along the vehicle longitudinal direction and the vehicle vertical direction). In this state, a weather strip 48 is interposed between the rear end portion 26B of the front side door 26 and the center pillar 20.

Then, as shown in FIG. 1 and FIG. 2, in the front side door 26 to which the vehicle side door structure 10 is applied, the acceleration sensor 50, which serves as an acceleration detector, is arranged in a hollow space R of the door body 46. The acceleration sensor 50 may, for example, output an analog signal corresponding to an acceleration or may, for example, output a predetermined detection signal when detecting an acceleration equal to or larger than a predetermined value. The acceleration sensor 50 is supported by the inner panel 42 of the door body 46 via a bracket 52, which serves as a support portion.

Specifically, the bracket 52 includes a fixed portion 52A, a free end portion 52B and an intermediate portion 52C. The fixed portion 52A serves as a supported portion and is connected to the flat portion 42A of the inner panel 42 in an overlapped manner by spot welding, or the like. The free end portion 52B is faced in the vehicle longitudinal direction. The intermediate portion 52C connects the fixed portion 52A with the free end portion 52B. The acceleration sensor 50 is fixedly attached to the free end portion 52B so that the direction of sensitivity of the acceleration sensor 50 (see the arrow S in FIG. 1) substantially coincides with the vehicle longitudinal direction. In addition, the intermediate portion 52C of the bracket 52 is inclined with respect to the vehicle width (door thickness) direction and the vehicle longitudinal direction. The above portions of the bracket 52 are integrally formed, for example, by stamping a metal plate material.

In addition, the vehicle side door structure 10 includes a pressing member 54. The pressing member 54 is fixed to the impact beam 32. The pressing member 54 and the intermediate portion 52C of the bracket 52 constitute a sensitivity direction changing portion. The pressing member 54 includes a fixed portion 54A and a pressing portion 54B. The fixed portion 54A is fixed to the impact beam 32 by welding, or the like. The pressing portion 54B is extended inward from the fixed portion 54A in the vehicle width direction. The distal end of the pressing portion 54B is located adjacent to the outer side of the intermediate portion 52C of the bracket 52 in the vehicle width direction.

Thus, in the vehicle side door structure 10, as the impact beam 32 relatively approaches the flat portion 42A of the inner panel 42, the pressing portion 54B of the pressing member 54 presses the intermediate portion 52C of the bracket 52 inward in the vehicle width direction. As the bracket 52 receives a pressing load from the pressing member 54, the intermediate portion 52C deforms so as to fall down toward the flat portion 42A of the inner panel 42 as shown by the alternate long and short dashed lines or imaginary line in FIG. 1. Thus, the bracket 52 changes its position to support the acceleration sensor 50. This change in position changes the direction of sensitivity of the acceleration sensor 50 so as to approach the vehicle width direction.

Next, the operations of the first embodiment will be described.

In the automobile A in which the above configured vehicle side door structure 10 is applied to the front side door 26, as the front side door 26, which leaves the vehicle body opening 12 open, is pivoted in the door closing direction about the upper and lower door hinges 30, the rear end portion 26B of the front side door 26 contacts the weather strip 48 (or contacts the center pillar 20 via the weather strip 48). Then, the direction of sensitivity of the acceleration sensor 50 supported on the door body 46 by the bracket 52 substantially coincides with the vehicle longitudinal direction, so a large signal is not output from the acceleration sensor 50.

On the other hand, when a pole P shown in FIG. 2 hits the side of the front side door 26, the impact beam 32 approaches the inner panel 42 together with the outer panel 44. Then, the pressing portion 54B of the pressing member 54 fixed to the impact beam 32 presses the intermediate portion 52C of the bracket 52, supported by the inner panel 42, inward in the vehicle width direction. This pressing force causes the intermediate portion 52C to fall down to a position aligned along the flat portion 42A of the inner panel 42, so the direction of sensitivity of the acceleration sensor 50 substantially coincides with the vehicle width direction.

Thus, the acceleration sensor 50 detects an acceleration in the vehicle width direction due to a collision against the pole P in high sensitivity, and outputs a signal corresponding to an input of a large acceleration. That is, in a collision configuration in which the front side door 26 is locally deformed by the pole P, it is possible to detect an acceleration in a short period of time from the start of impact.

For example, in a structure (comparative embodiment) in which the acceleration sensor 50 is simply arranged inside the door body 46 of the front side door 26, a collision between the pole P and the front side door 26 may be detected in a short period of time; however, when the rear end portion 26B is brought into contact with the center pillar 20 (weather strip 48) so that the front side door 26 is slammed as well, the acceleration sensor 50 also outputs a signal corresponding to an input of a large acceleration. That is, it is impossible to distinguish a side collision of the front side door 26 from slamming of the front side door 26. Thus, with the structure according to the comparative embodiment, it is difficult to use a signal from the acceleration sensor 50 as a trigger for activating a safety device.

In contrast, in the vehicle side door structure 10 according to the present embodiment of the invention, the direction of sensitivity of the acceleration sensor 50 normally differs from the door closing direction as described above, and the direction of sensitivity of the acceleration sensor 50 is made to substantially coincide with an impact direction as the impact beam 32 is relatively displaced toward the inner panel 42 owing to a side collision. Thus, it is possible to detect a side collision of the front side door 26 as distinguished from slamming of the front side door 26.

In addition, in the vehicle side door structure 10, as a portion (intermediate portion 52C) between the fixed portion 52A and the free end portion 52B (a portion at which the acceleration sensor 50 is held) in the bracket 52 is pressed by the pressing member 54, the bracket 52 deforms to change the direction of sensitivity of the acceleration sensor 50. On the principle of leverage, a stroke S2 of displacement of the acceleration sensor 50 is amplified with respect to a stroke S1 (see FIG. 1) of the bracket 52 pressed by the pressing member 54. Thus, the vehicle side door structure 10 is able to improve detectivity by allowing a large acceleration to act on the acceleration sensor 50 at the time of a side collision of the front side door 26.

In this way, with the vehicle side door structure 10 according to the first embodiment of the invention, it is possible to detect an acceleration at the time of a side collision in which the outer panel 44 is displaced toward the inner panel 42 as distinguished from an acceleration at the time when the door body 46 is slammed.

In addition, in the vehicle side door structure 10, the pressing member 54 is provided on the impact beam 32 that extends over substantially the overall length of the front side door 26. Thus, it is possible to effectively press the bracket 52 by the pressing member 54 at the time of a side collision of the front side door 26, and this contributes to detecting a side collision in a short period of time. For example, it is possible to detect a side collision of the door body irrespective of a location of impact on the door body in the longitudinal direction.

Next, alternative embodiments of the invention will be described. Like reference numerals to those of the first embodiment or the above described configuration denote like components to those of the first embodiment or the above described configuration, and the description thereof will be omitted.

Figure 4A:
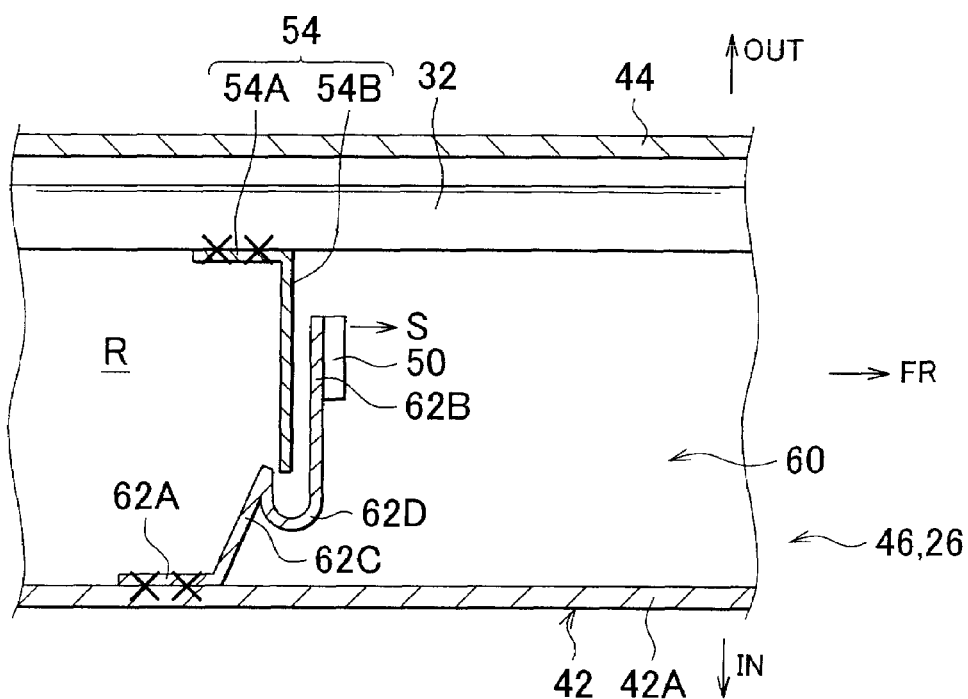
FIG. 4A is a schematic horizontal cross-sectional view that shows a relevant portion of a vehicle door structure according to a second embodiment of the invention before a collision occurs.
Figure 4B:
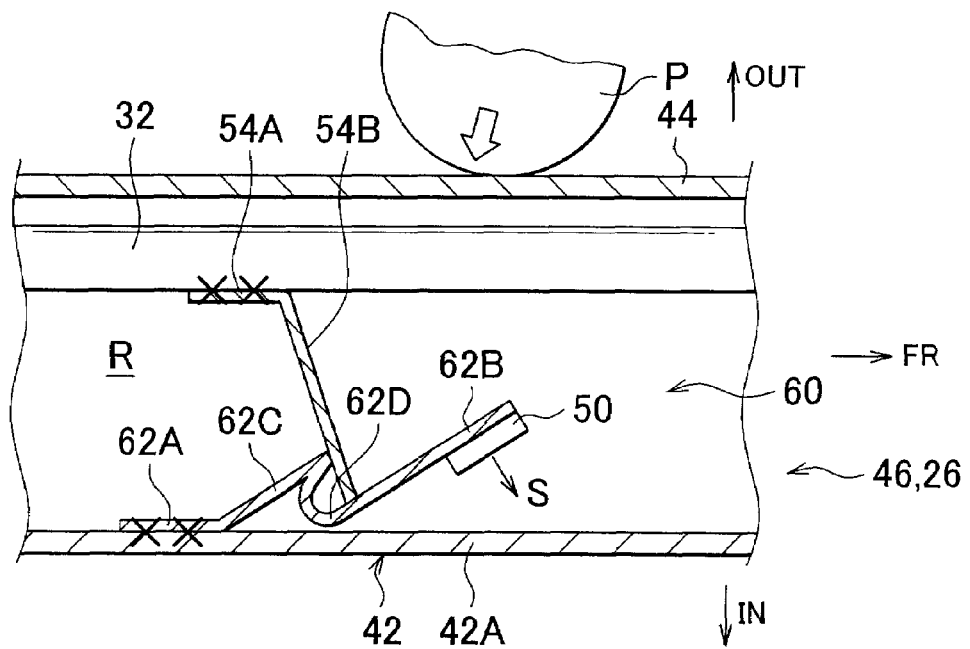
FIG. 4B is a schematic horizontal cross-sectional view that shows the relevant portion of the vehicle door structure according to the second embodiment of the invention at the time of a side collision.

FIG. 4A shows a schematic horizontal cross-sectional view of a vehicle side door structure 60 according to a second embodiment of the invention. FIG. 4B shows a schematic horizontal cross-sectional view of a state of the vehicle side door structure 60 at the time of a side collision. As shown in these drawings, the vehicle side door structure 60 differs from the vehicle side door structure 10 according to the first embodiment in that a bracket 62 is provided instead of the bracket 52.

The bracket 62 includes a fixed portion 62A, a free end portion 62B and an intermediate portion 62C. The fixed portion 62A serves as a supported portion and is connected to the flat portion 42A of the inner panel 42 in an overlapped manner by spot welding, or the like. The free end portion 62B is faced in the vehicle longitudinal direction. The intermediate portion 62C connects the fixed portion 62A with the free end portion 62B. The acceleration sensor 50 is fixedly attached to the free end portion 62B so that the direction of sensitivity of the acceleration sensor 50 (see the arrow S in FIG. 1) substantially coincides with the vehicle longitudinal direction.

Then, the intermediate portion 62C of the bracket 62 is formed so that the free end portion 62B is offset from the fixed portion 62A in the vehicle longitudinal direction. The intermediate portion 62C has a substantially U-shaped (or J-shaped) engagement portion 62D that is open outward in the vehicle width direction. As shown in FIG. 4B, when a side collision of the front side door 26 occurs, the bracket 62 is pressed by the pressing portion 54B of the pressing member 54 inward in the vehicle width direction while a deviation of a location at which the bracket 62 is pressed is suppressed by the engagement portion 62D of the intermediate portion 62C of the bracket 62.

That is, the engagement portion 62D of the bracket 62 prevents or effectively suppresses a deviation of a pressed portion, at which the bracket 62 is pressed by the pressing member 54, toward the fixed portion 62A. The other configuration of the vehicle side door structure 60 is similar to the corresponding configuration of the vehicle side door structure 10.

Thus, with the vehicle side door structure 60 according to the second embodiment as well, it is possible to obtain similar advantageous effects through basically similar operations to those of the vehicle side door structure 10 according to the first embodiment. In addition, in the vehicle side door structure 60, the bracket 62 is pressed by the pressing member 54B while the engagement portion 62D of the bracket 62 is engaged with the pressing portion 54B. Thus, it is possible to effectively press the bracket 62 by the pressing member 54 at the time of a side collision of the front side door 26, and this contributes to detecting a side collision in a short period of time.

Figure 5A:
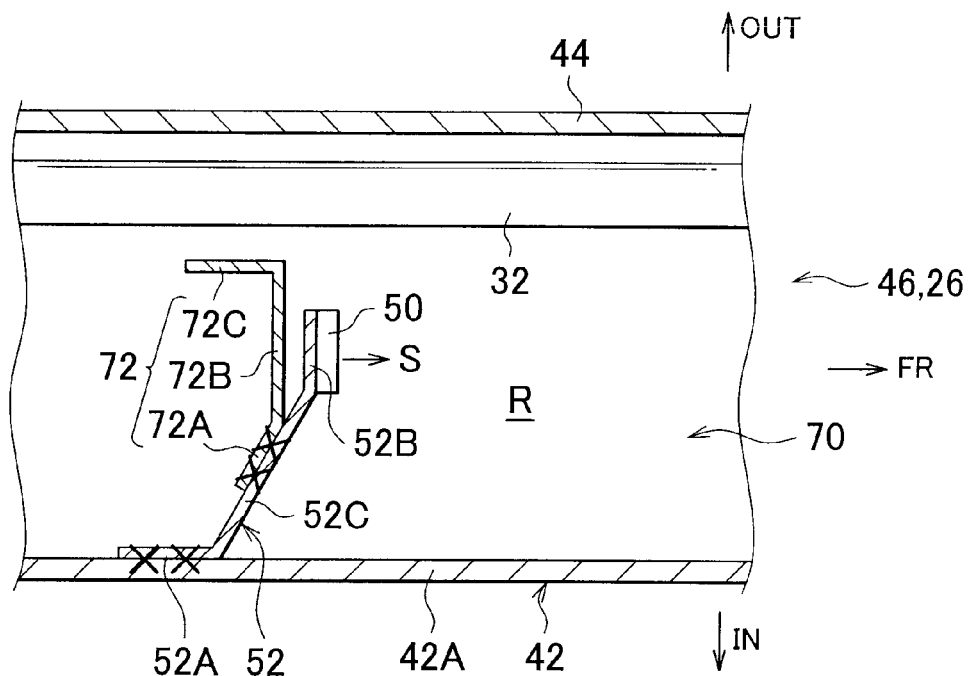
FIG. 5A is a schematic horizontal cross-sectional view that shows a relevant portion of a vehicle door structure according to a third embodiment of the invention before a collision occurs.
Figure 5B:
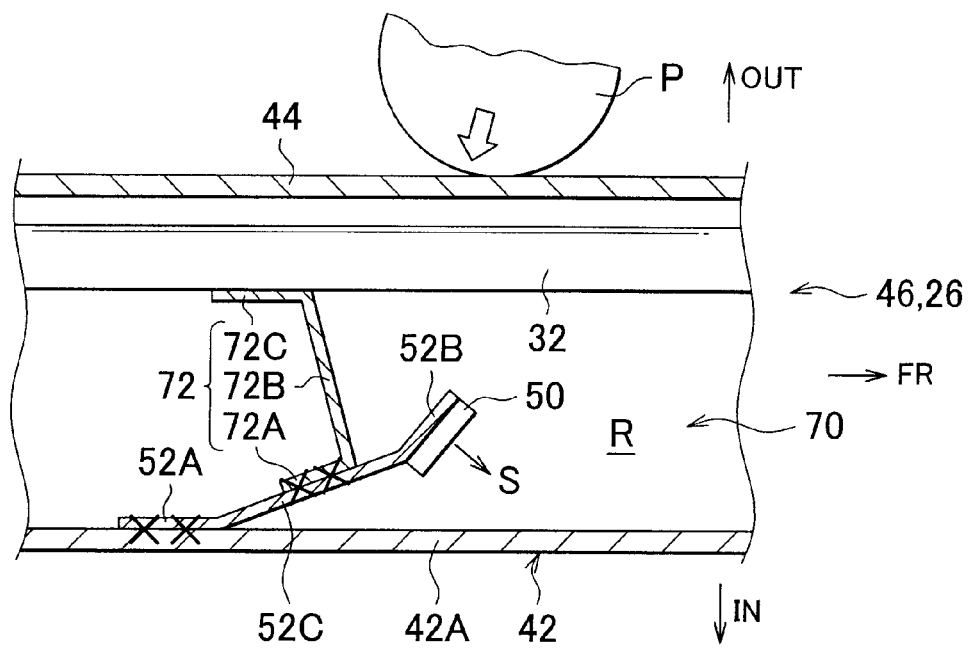
FIG. 5B is a schematic horizontal cross-sectional view that shows the relevant portion of the vehicle door structure according to the third embodiment of the invention at the time of a side collision.

FIG. 5A shows a schematic horizontal cross-sectional view of a vehicle side door structure 70 according to a third embodiment of the invention. FIG. 5B shows a schematic horizontal cross-sectional view of a state of the vehicle side door structure 70 at the time of a side collision. As shown in these drawings, the vehicle side door structure 70 differs from the vehicle side door structure 10 according to the first embodiment in that a pressing member 72 is provided instead of the pressing member 54.

The pressing member 72 includes a pressing portion (load output portion) 72A, a load transmitting portion 72B, and a pressed portion (load input portion) 72C as major components. The pressing portion 72A is fixedly connected to the intermediate portion 52C of the bracket 52. The load transmitting portion 72B is extended outward from the pressing portion 72A in the vehicle width direction. The pressed portion 72C is arranged at an outer end of the load transmitting portion 72B in the vehicle width direction so as to face the impact beam 32 in the vehicle width direction. The pressed portion 72C is spaced a predetermined gap (slightly) away from the impact beam 32 in the vehicle width direction.

As shown in FIG. 5B, in the vehicle side door structure 70, when a side collision of the front side door 26 occurs, the pressed portion 72C of the pressing member 72 is pressed by the impact beam 32 inward in the vehicle width direction and then the pressing portion 72A presses the intermediate portion 52C inward in the vehicle width direction. The pressed portion 72C may have a guide piece, or the like, for preventing a deviation of a location of the pressed portion 72C with respect to the impact beam 32 in the vehicle vertical direction. The other configuration of the vehicle side door structure 70 is similar to the corresponding configuration of the vehicle side door structure 10.

Thus, with the vehicle side door structure 70 according to the third embodiment as well, it is possible to obtain similar advantageous effects through basically similar operations to those of the vehicle side door structure 10 according to the first embodiment. In addition, in the vehicle side door structure 70, the pressing portion 72A of the pressing member 72 is fixedly connected to the intermediate portion 52C of the bracket 52. Thus, it is possible to effectively press the bracket 52 by the pressing member 72 without a deviation in location at the time of a side collision of the front side door 26, and this contributes to detecting a side collision in a short period of time.

Figure 6:
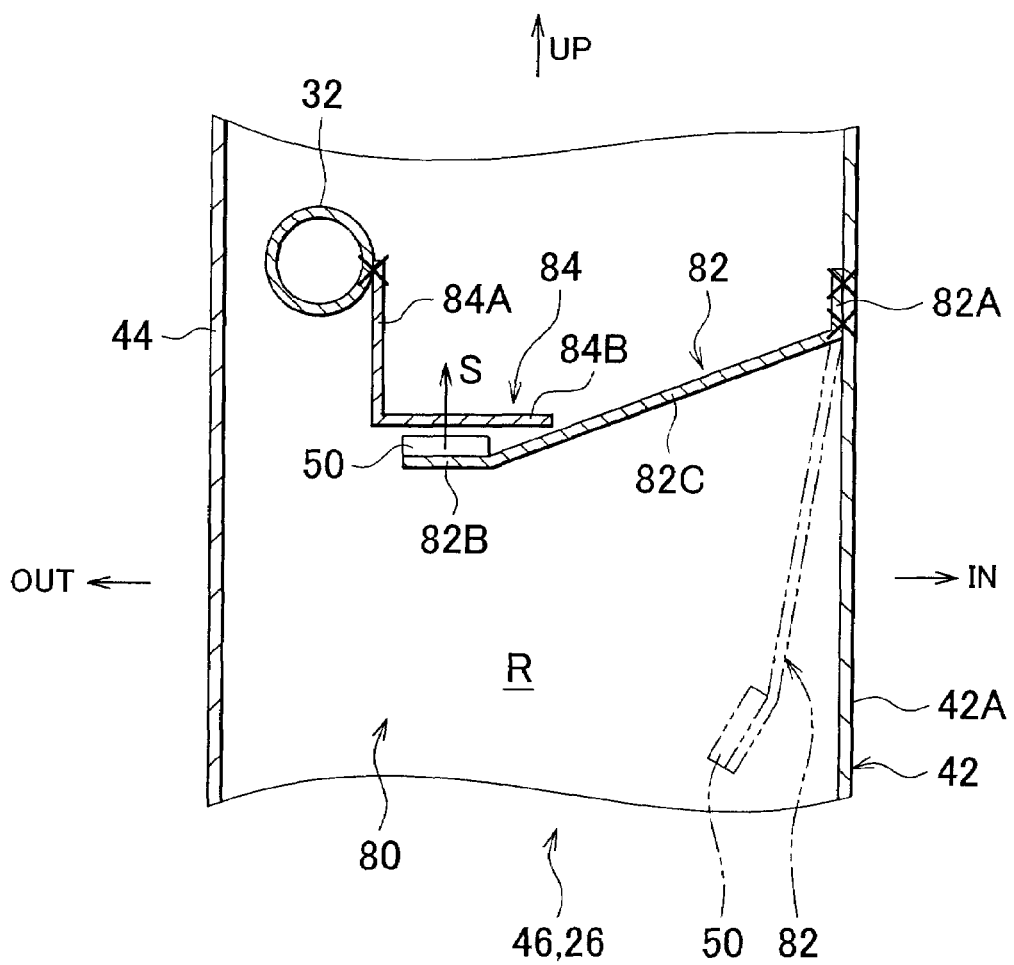
FIG. 6 is a schematic rear cross-sectional view that shows a relevant portion of a vehicle door structure according to a fourth embodiment of the invention.

FIG. 6 shows a schematic rear cross-sectional view of a vehicle side door structure 80 according to a fourth embodiment of the invention. As shown in the drawing, the vehicle side door structure 80 differs from the vehicle side door structure 10 according to the first embodiment in that a bracket 82 and a pressing member 84 are provided instead of the bracket 52 and the pressing member 54.

The bracket 82 includes a fixed portion 82A, a free end portion 82B and an intermediate portion 82C. The fixed portion 82A serves as a supported portion and is connected to the flat portion 42A of the inner panel 42 in an overlapped manner by spot welding, or the like. The free end portion 82B is faced in the vehicle vertical direction. The intermediate portion 82C connects the fixed portion 82A with the free end portion 82B. The acceleration sensor 50 is fixedly attached to the free end portion 82B so that the direction of sensitivity of the acceleration sensor 50 (see the arrow S in FIG. 1) substantially coincides with the vehicle vertical direction. In addition, the intermediate portion 82C of the bracket 82 is inclined with respect to the vehicle width (door thickness) direction and the vehicle vertical direction. The above portions of the bracket 82 are integrally formed, for example, by stamping a metal plate material.

The pressing member 84 includes a fixed portion 84A and a pressing portion 84B. The fixed portion 84A is fixed to the impact beam 32 by welding, or the like. The pressing portion 84B is extended inward from the fixed portion 84A in the vehicle width direction. The distal end of the pressing portion 84B is located adjacent to the outer side of the intermediate portion 82C of the bracket 82 in the vehicle width direction.

Thus, in the vehicle side door structure 80, as the impact beam 32 relatively approaches the flat portion 42A of the inner panel 42, the pressing portion 84B of the pressing member 84 presses the intermediate portion 82C of the bracket 82 inward in the vehicle width direction. As the bracket 82 receives a pressing load from the pressing member 84, the intermediate portion 82C deforms so as to fall down toward the flat portion 42A of the inner panel 42 as shown by the imaginary line in FIG. 6. Thus, the bracket 82 changes its position to support the acceleration sensor 50. This change in position changes the direction of sensitivity of the acceleration sensor 50 so as to approach the vehicle width direction. The other configuration of the vehicle side door structure 80 is similar to the corresponding configuration of the vehicle side door structure 10.

Thus, with the vehicle side door structure 80 according to the fourth embodiment as well, it is possible to obtain similar advantageous effects through basically similar operations to those of the vehicle side door structure 10 according to the first embodiment. In addition, in the vehicle side door structure 80, the direction of sensitivity of the acceleration sensor 50 is normally set to the vehicle vertical direction. Thus, for example, the vehicle side door structure 80 may be applied to a slide door that is operated to open or shut the vehicle body opening 12 in the vehicle longitudinal direction, instead of the hinged front side door 26 that is supported on the vehicle body by the upper and lower door hinges 30.

Figure 7A:
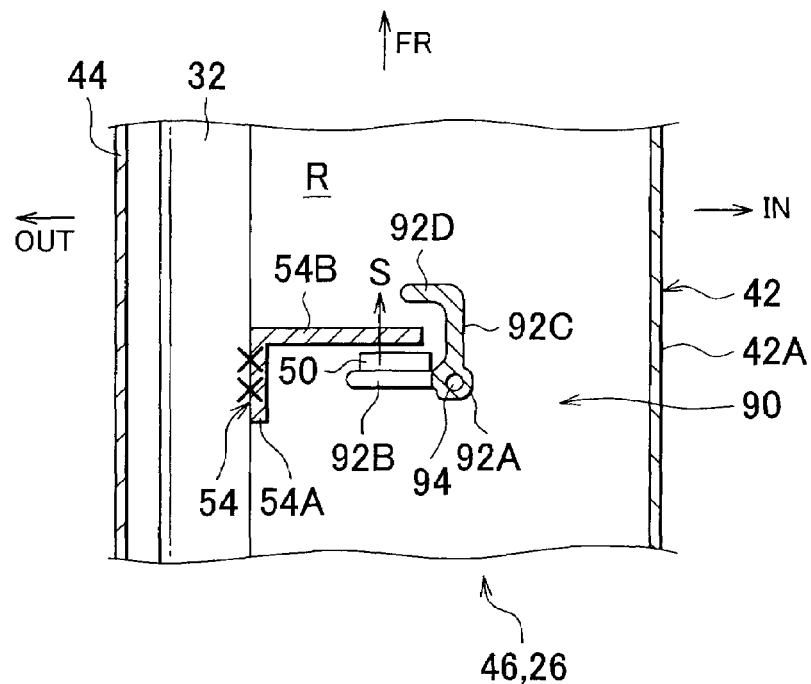
FIG. 7A is a schematic horizontal cross-sectional view that shows a relevant portion of a vehicle door structure according to a fifth embodiment of the invention before a collision occurs.
Figure 7B:
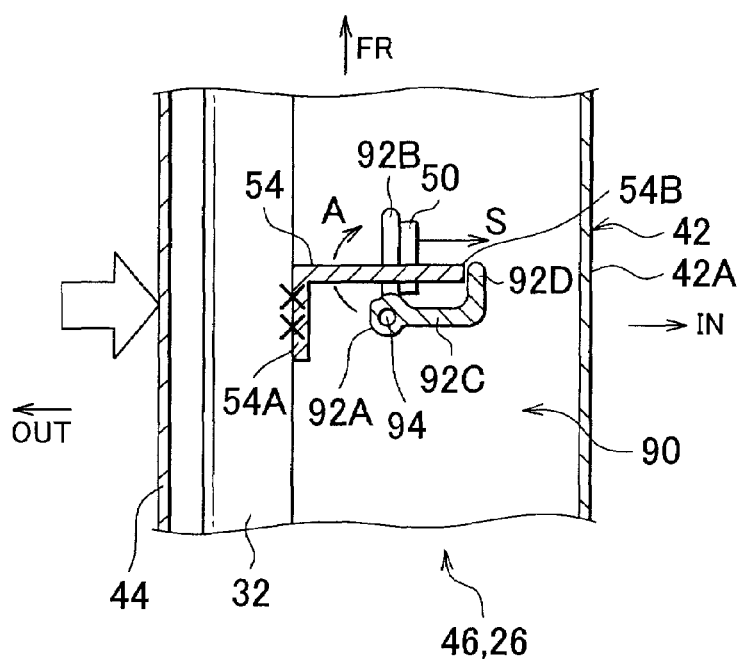
FIG. 7B is a schematic horizontal cross-sectional view that shows the relevant portion of the vehicle door structure according to the fifth embodiment of the invention at the time of a side collision.

FIG. 7A shows a schematic horizontal cross-sectional view of a vehicle side door structure 90 according to a fifth embodiment of the invention. FIG. 7B shows a schematic horizontal cross-sectional view of a state of the vehicle side door structure 90 at the time of a side collision. As shown in these drawings, the vehicle side door structure 90 differs from the vehicle side door structure 10 according to the first embodiment in that a movable arm 92 is provided instead of the bracket 52.

The movable arm 92 includes a proximal portion 92A, a sensor holding arm 92B and a load receiving arm 92C. The proximal portion 92A is pivotably supported by the door body 46 (inner panel 42 side) via a spindle 94 that is aligned in the vehicle vertical direction. The sensor holding arm 92B and the load receiving arm 92C are extended from the proximal portion 92A. The sensor holding arm 92B holds the acceleration sensor 50. The movable arm 92 is normally held by a lock structure, such as an engagement pawl (not shown), in a position in which the sensor holding arm 92B is faced in the vehicle longitudinal direction, and the direction of sensitivity of the acceleration sensor 50 is set to the vehicle longitudinal direction. In this state, the load receiving arm 92C extends in the vehicle longitudinal direction at a location offset from the sensor holding arm 92B in the vehicle vertical direction.

In the vehicle side door structure 90, as the load receiving arm 92C is pressed inward by the pressing portion 54B of the pressing member 54 in the vehicle width direction at a load larger than or equal to a predetermined value, the above described lock structure is unlocked (for example, the engagement pawl breaks), and then the movable arm 92 pivots in the arrow A direction about the spindle 94. Thus, the direction of sensitivity of the acceleration sensor 50 approaches the vehicle width direction as shown in FIG. 7B. Note that a hook portion 92D is formed at the distal end of the load receiving arm 92C to prevent the pressing portion 54B from being disengaged. Thus, in the present embodiment, the pressing member 54 and the load receiving arm 92C and hook portion 92D of the movable arm 92 correspond to a sensitivity direction changing portion according to the aspects of the invention. The other configuration of the vehicle side door structure 90 is similar to the corresponding configuration of the vehicle side door structure 10.

Thus, with the vehicle side door structure 90 according to the fifth embodiment as well, it is possible to obtain similar advantageous effects through basically similar operations to those of the vehicle side door structure 10 according to the first embodiment except that the advantageous effect of amplification of a displacement of the acceleration sensor 50 based on the principle of leverage.

Note that the fifth embodiment describes an example in which the direction of sensitivity of the acceleration sensor 50 is normally set to the vehicle longitudinal direction; however, the aspects of the invention are not limited to this configuration. Instead, for example, as in the case of the fourth embodiment, the direction of sensitivity of the acceleration sensor 50 may be normally set to the vehicle vertical direction.

In addition, the above described embodiments describe an example in which the bracket 52 (pressing member 72), 62, 82 or the movable arm 92, which supports the acceleration sensor 50 on the inner panel 42, is pressed inward by the impact beam 32 or the pressing member 54, 72 or 84 fixed to the impact beam 32 in the vehicle width direction to change the direction of sensitivity of the acceleration sensor 50; however, the aspects of the invention are not limited to the above embodiments. Instead, for example, it is applicable that the bracket 52 (pressing member 72), 62, 82, or the like, which supports the acceleration sensor 50 on the outer panel 44 side, is pressed against the pressing member 54, 72, 84, or the like, provided on the inner panel 42 side (the pressing member 54, 72, 84, or the like, is caused to press the bracket 52 (pressing member 72), 62, 82, or the like) to change the direction of sensitivity of the acceleration sensor 50.

In addition, the above embodiments describe an example in which the aspects of the invention are applied to the front side door 26; however, the aspects of the invention are not limited to the above embodiments. Instead, for example, the aspects of the invention may be applied to the rear side door 28 or the aspects of the invention may be applied to a back door for opening or closing an opening that is open rearward of the vehicle.

Furthermore, the above embodiments describe an example in which the direction of sensitivity of the acceleration sensor 50 is changed as the impact beam 32, which serves as a reinforcement member, is relatively displaced toward (relatively approaches) the inner panel 42; however, the aspects of the invention are not limited to the above embodiments. Instead, for example, it is applicable that the direction of sensitivity of the acceleration sensor 50 is changed as another reinforcement member, such as a dent reinforcement, or a portion provided at the outer panel 44 side, other than the reinforcement member, is relatively displaced toward (relatively approaches) the inner panel 42.

Other than that, the aspects of the invention may be modified into various forms without departing from the scope of the invention.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A vehicle door structure comprising:
   a door body that includes an inner panel and an outer panel and that has a space between the inner panel and the outer panel;
   an acceleration detector that is arranged in the space;
   a support portion that supports the acceleration detector on the door body so that a direction of sensitivity of the acceleration detector differs from a direction in which the door body is closed; and
   a sensitivity direction changing portion that changes a position in which the acceleration detector is supported by the support portion so that the direction of sensitivity of the acceleration detector changes and approaches a direction in which the inner panel faces the outer panel as the outer panel is relatively displaced toward the inner panel.

2. The vehicle door structure according to claim 1, further comprising:
   a reinforcement member that is arranged in the space and that reinforces the door body over substantially an overall length of the door body in a vehicle longitudinal direction, wherein
   the sensitivity direction changing portion changes a position in which the acceleration detector is supported by the support portion so that the direction of sensitivity of the acceleration detector approaches the direction in which the inner panel faces the outer panel as the reinforcement member is relatively displaced toward the inner panel.

3. A vehicle door structure comprising:
   a door body that includes an inner panel and an outer panel and that has a space between the inner panel and the outer panel;
   an acceleration detector that is arranged in the space;
   a bracket that has a cantilever structure in which one end of the bracket is a supported portion supported by the door body and the other end of the bracket is a free end, wherein the bracket holds the acceleration detector at a location that is distanced from the supported portion toward the free end; and
   a pressing member that presses a location of the bracket, distanced from the supported portion toward the free end, as the outer panel is relatively displaced toward the inner panel to deform the bracket to thereby change a position in which the acceleration detector is supported so that a direction of sensitivity of the acceleration detector changes and approaches a direction in which the inner panel faces the outer panel.

4. The vehicle door structure according to claim 3, wherein the supported portion of the bracket is supported so that the direction of sensitivity of the acceleration detector held by the bracket differs from a direction in which the door body is closed.

5. The vehicle door structure according to claim 3, wherein the pressing member presses a portion of the bracket between the supported portion and a portion of the bracket at which the acceleration detector is held.

6. The vehicle door structure according to claim 5, wherein the bracket has an engagement portion, with which the pressing member is engaged, between the supported portion and a portion of the bracket at which the acceleration detector is held.

7. The vehicle door structure according to claim 5, wherein one end portion of the pressing member is fixed to a pressed portion of the bracket.

8. The vehicle door structure according to claim 3, further comprising:
   a reinforcement member that is arranged in the space and that reinforces the door body over substantially an overall length of the door body in a vehicle longitudinal direction, wherein
   the bracket and the pressing member change a position in which the acceleration detector is supported so that the direction of sensitivity of the acceleration detector approaches the direction in which the inner panel faces the outer panel as the reinforcement member is relatively displaced toward the inner panel.

9. The vehicle door structure according to claim 8, wherein one of the bracket and the pressing member is fixed to the reinforcement member.

10. A vehicle door structure comprising:
    a door body that includes an inner panel and an outer panel and that has a space between the inner panel and the outer panel;
    an acceleration detector that is arranged in the space;
    a movable arm that includes a proximal portion that is rotatably supported by the door body, a sensor holding arm that is extended from the proximal portion and that holds the acceleration detector, and a load receiving arm that is extended from the proximal portion in a direction different from a direction in which the sensor holding arm is extended; and
    a pressing member that presses the load receiving arm of the movable arm as the outer panel is relatively displaced toward the inner panel to rotate the movable arm to thereby change a position in which the acceleration detector is supported so that a direction of sensitivity of the acceleration detector changes and approaches a direction in which the inner panel faces the outer panel.

11. The vehicle door structure according to claim 10, wherein
    the movable arm is supported by a lock structure so that the direction of sensitivity of the acceleration detector differs from a direction in which the door body is closed, and
    when the pressing member presses the load receiving arm of the movable arm, the lock structure is unlocked to allow the movable arm to rotate.

* * * * *